США012017705B2

(12) United States Patent
Archer

(10) Patent No.: US 12,017,705 B2
(45) Date of Patent: Jun. 25, 2024

(54) STAY ARM FOR A VEHICLE CAB

(71) Applicant: Oshkosh Corporation, Oshkosh, WI (US)

(72) Inventor: David W. Archer, Hortonville, WI (US)

(73) Assignee: Oshkosh Corporation, Oshkosh, WI (US)

( * ) Notice: Subject to any disclaimer, the term of this patent is extended or adjusted under 35 U.S.C. 154(b) by 358 days.

(21) Appl. No.: 17/506,049

(22) Filed: Oct. 20, 2021

(65) Prior Publication Data

US 2022/0177055 A1    Jun. 9, 2022

Related U.S. Application Data

(60) Provisional application No. 63/122,151, filed on Dec. 7, 2020.

(51) Int. Cl.
| | |
|---|---|
| *B62D 33/07* | (2006.01) |
| *B62D 33/06* | (2006.01) |
| *B62D 33/063* | (2006.01) |
| *F16D 63/00* | (2006.01) |

(52) U.S. Cl.
CPC ......... *B62D 33/0633* (2013.01); *B62D 33/07* (2013.01); *F16D 63/006* (2013.01)

(58) Field of Classification Search
CPC ...... B62D 33/07; B62D 33/067; F16D 63/006
USPC ................................ 296/190.05, 6; 292/338
See application file for complete search history.

(56) References Cited

U.S. PATENT DOCUMENTS

| | | | | |
|---|---|---|---|---|
| 4,840,398 | A | * | 6/1989 | Matthias ................. B60R 21/13 |
| | | | | 280/756 |
| 5,538,274 | A | | 7/1996 | Schmitz et al. |
| 5,547,244 | A | * | 8/1996 | Lee .................... B62D 33/0617 |
| | | | | 296/102 |
| 5,671,820 | A | * | 9/1997 | Kobayashi ............ E02F 9/0891 |
| | | | | 180/69.21 |
| 5,820,150 | A | | 10/1998 | Archer et al. |
| 5,897,123 | A | | 4/1999 | Cherney et al. |
| 5,941,330 | A | * | 8/1999 | Miller ..................... E02F 9/166 |
| | | | | 180/328 |
| 6,543,563 | B1 | * | 4/2003 | Muraro ................. E02F 9/2275 |
| | | | | 180/89.12 |
| 6,561,718 | B1 | | 5/2003 | Archer et al. |
| 6,860,332 | B1 | | 3/2005 | Archer et al. |
| 6,883,815 | B2 | | 4/2005 | Archer |
| 6,976,688 | B2 | | 12/2005 | Archer et al. |

(Continued)

*Primary Examiner* — Dennis H Pedder
(74) *Attorney, Agent, or Firm* — Foley & Lardner LLP

(57) ABSTRACT

A vehicle includes a support assembly extending between a chassis and a cab. The support assembly includes a first bracket coupled to the chassis, a second bracket coupled to the cab, a stay arm having a first end coupled to the first bracket and an opposing second end, and a locking assembly. The stay arm defines a locking interface between the first end and the opposing second end. The locking assembly includes a slide, an actuator, a release arm, and a pawl. The slide is translatable along the stay arm. The slide defines a first interface coupled to the second bracket, a second interface coupled to the actuator, and a third interface. The release arm is coupled to the actuator and the third interface. The pawl is coupled to release arm at the third interface. The pawl selectively engages with the locking interface based on a configuration of the actuator.

19 Claims, 5 Drawing Sheets

(56) References Cited

U.S. PATENT DOCUMENTS

| | | | | |
|---|---|---|---|---|
| 7,006,902 | B2 | 2/2006 | Archer et al. | |
| 7,055,880 | B2 | 6/2006 | Archer | |
| 7,287,810 | B2 * | 10/2007 | Ishii | B62D 33/0604 296/190.07 |
| 7,338,114 | B2 * | 3/2008 | Ishii | B62D 33/07 180/89.18 |
| 7,387,348 | B2 | 6/2008 | Archer et al. | |
| 7,389,826 | B2 | 6/2008 | Linsmeier et al. | |
| 7,878,472 | B2 | 2/2011 | Lackore | |
| 8,096,608 | B2 * | 1/2012 | Andou | E02F 9/0833 180/89.18 |
| 8,201,656 | B2 | 6/2012 | Archer et al. | |
| 8,839,902 | B1 | 9/2014 | Archer et al. | |
| 9,492,695 | B2 | 11/2016 | Betz et al. | |
| 9,580,962 | B2 | 2/2017 | Betz et al. | |
| 10,144,389 | B2 | 12/2018 | Archer et al. | |
| 10,294,086 | B2 | 5/2019 | Mellott et al. | |
| 10,370,003 | B2 | 8/2019 | Linsmeier et al. | |
| 10,414,385 | B2 | 9/2019 | Linsmeier et al. | |
| 10,442,668 | B1 | 10/2019 | Betz et al. | |
| 10,456,610 | B1 | 10/2019 | Betz et al. | |
| 10,458,182 | B1 | 10/2019 | Betz et al. | |
| 10,463,900 | B1 | 11/2019 | Betz et al. | |
| 10,479,664 | B2 | 11/2019 | Linsmeier et al. | |
| 10,532,722 | B1 | 1/2020 | Betz et al. | |
| 10,611,347 | B1 | 4/2020 | Archer et al. | |
| 10,611,611 | B2 | 4/2020 | Mellott et al. | |
| 10,960,248 | B2 | 3/2021 | Betz et al. | |
| 10,981,538 | B2 | 4/2021 | Archer et al. | |
| 11,020,621 | B2 | 6/2021 | Betz et al. | |
| 11,027,738 | B2 | 6/2021 | Linsmeier et al. | |
| 11,130,663 | B2 | 9/2021 | Linsmeier et al. | |
| 11,161,483 | B2 | 11/2021 | Betz et al. | |
| 11,167,734 | B2 | 11/2021 | Linsmeier et al. | |
| 11,181,111 | B2 | 11/2021 | Linsmeier et al. | |
| 11,225,400 | B2 | 1/2022 | Mellott et al. | |
| 2006/0021764 | A1 | 2/2006 | Archer et al. | |
| 2006/0022001 | A1 | 2/2006 | Linsmeier et al. | |
| 2006/0032701 | A1 | 2/2006 | Linsmeier et al. | |
| 2006/0032702 | A1 | 2/2006 | Linsmeier et al. | |
| 2006/0086566 | A1 | 4/2006 | Linsmeier et al. | |
| 2007/0187414 | A1 | 8/2007 | Lackore | |
| 2020/0039804 | A1 | 2/2020 | Betz et al. | |
| 2020/0056426 | A1 | 2/2020 | Betz et al. | |
| 2020/0231131 | A1 | 7/2020 | Archer et al. | |
| 2021/0178206 | A1 | 6/2021 | Betz et al. | |
| 2021/0229628 | A1 | 7/2021 | Archer et al. | |
| 2021/0244982 | A1 | 8/2021 | Betz et al. | |
| 2021/0253102 | A1 | 8/2021 | Linsmeier et al. | |
| 2022/0009761 | A1 | 1/2022 | Archer et al. | |
| 2022/0017048 | A1 | 1/2022 | Betz et al. | |
| 2022/0024425 | A1 | 1/2022 | Linsmeier et al. | |

* cited by examiner

STAY ARM FOR A VEHICLE CAB

CROSS-REFERENCE TO RELATED PATENT APPLICATION

This application claims the benefit of and priority to U.S. Provisional Patent Application No. 63/122,151, filed Dec. 7, 2020, which is incorporation herein by reference in its entirety.

BACKGROUND

Vehicles may be designed with a cab and an engine in a cab-over-engine ("COE") arrangement. The cab of such vehicles may be pivotably coupled to the chassis thereof to allow access to the engine positioned beneath the cab.

SUMMARY

One embodiment relates to a vehicle. The vehicle includes a chassis, a cab pivotably coupled to the chassis, and a support assembly extending between the chassis and the cab. The cab is repositionable between a lowered position and a raised position. The support assembly includes a first bracket coupled to the chassis, a second bracket coupled to the cab, a stay arm having a first stay arm end and an opposing second stay arm end, and a locking assembly coupled to the stay arm. The first stay arm end is coupled to the first bracket. The stay arm defines a locking interface between the first stay arm end and the opposing second stay arm end. The locking interface includes one or more notches. The locking assembly includes a slide, an actuator, a release arm, and a pawl. The slide is translatable along the stay arm between the first stay arm end and the opposing second stay arm end. The slide defines a first interface, a second interface, and a third interface. The first interface is coupled to the second bracket. The actuator has a first actuator end and a second actuator end. The first actuator end is coupled to the second interface of the slide. The release arm has a first release arm end and a second release arm end. The first release arm end is coupled to the second actuator end. The second release arm end is coupled to the third interface of the slide. The pawl is coupled to the second release arm end. The pawl is positioned to engage with the locking interface when the actuator is in a first configuration and disengage from the locking interface when the actuator is in a second configuration.

Another embodiment relates to a support assembly for a vehicle. The support assembly includes a first bracket configured to couple to a first portion of the vehicle, a second bracket configured to couple to a second portion of the vehicle, a stay arm having a first stay arm end and an opposing second stay arm end, and a locking assembly coupled to the stay arm. The first stay arm end is coupled to the first bracket. The stay arm defines a locking interface between the first stay arm end and the opposing second stay arm end. The locking interface includes one or more notches. The locking assembly includes a slide, an actuator, a release arm, and a pawl. The slide is translatable along the stay arm between the first stay arm end and the opposing second stay arm end. The slide defines a first interface, a second interface, and a third interface. The first interface is coupled to the second bracket. The actuator has a first actuator end and a second actuator end. The first actuator end is coupled to the second interface of the slide. The release arm has a first release arm end and a second release arm end. The first release arm end is coupled to the second actuator end. The second release arm end is coupled to the third interface of the slide. The pawl is coupled to the second release arm end. The pawl is positioned to engage with the locking interface when the actuator is in a first configuration and disengage from the locking interface when the actuator is in a second configuration.

Still another embodiment relates to a support assembly. The support assembly includes a first bracket configured to couple to a first component, a second bracket configured to couple to a second component, a stay arm, a slide, an actuator, an arm, and a pawl. The stay arm has a first stay arm end and an opposing second stay arm end. The first stay arm end is pivotably coupled to the first bracket. The stay arm defines a locking interface between the first stay arm end and the opposing second stay arm end. The locking interface includes a plurality of notches. The slide is translatable along the stay arm between the first stay arm end and the opposing second stay arm end. The slide defines a channel that receives the stay arm. The slide includes a first flange, a second flange, and a mount. The first flange extends downward from a first slide end of the slide and beneath the stay arm. The first flange defines a first aperture that pivotably couples the slide to the second bracket. The second flange extends downward from an opposing second slide end of the slide and beneath the stay arm. The second flange defines a second aperture. The mount extends upward from the first slide end of the slide and above the stay arm. The actuator has a first actuator end and a second actuator end. The first actuator end is pivotably coupled to the mount. The arm has a first arm end and a second arm end. The first arm end is coupled to the second actuator end at an interface and the second arm end engages with the second aperture of the second flange of the slide such that the arm extends from the actuator, across the stay arm, and to the second flange of the slide. The pawl is coupled to the second arm end of the arm and at least partially positioned within the channel of the slide. The pawl is positioned to engage with the locking interface when the actuator is in a first configuration and disengage from the locking interface when the actuator is in a second configuration. The pawl is fixed relative to the arm, and the interface is spring biased such that the pawl ratchets as the slide translates toward the opposing second stay arm end and across the plurality of notches.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes a stay arm assembly that is configured to hold or lock (e.g., automatically, etc.) a cab of the vehicle in a raised position to prevent the cab from inadvertently pivoting back to a lowered position (e.g., absent user interaction, absent a user command, etc.). While the stay arm assembly is described herein as being designed to hold or lock the cab of the vehicle in the raised position, the stay arm assembly can be similarly applied in various other applications to hold a pivoting element or component in a pivoted position. For example, the stay arm assembly may be scaled as necessary and applied to an engine enclosure or hood, compartment doors of compartments on or along the vehicle, a lift mechanism for controlling overhead loads, and/or any other pivoting element or component on the vehicle.

Figure 1:
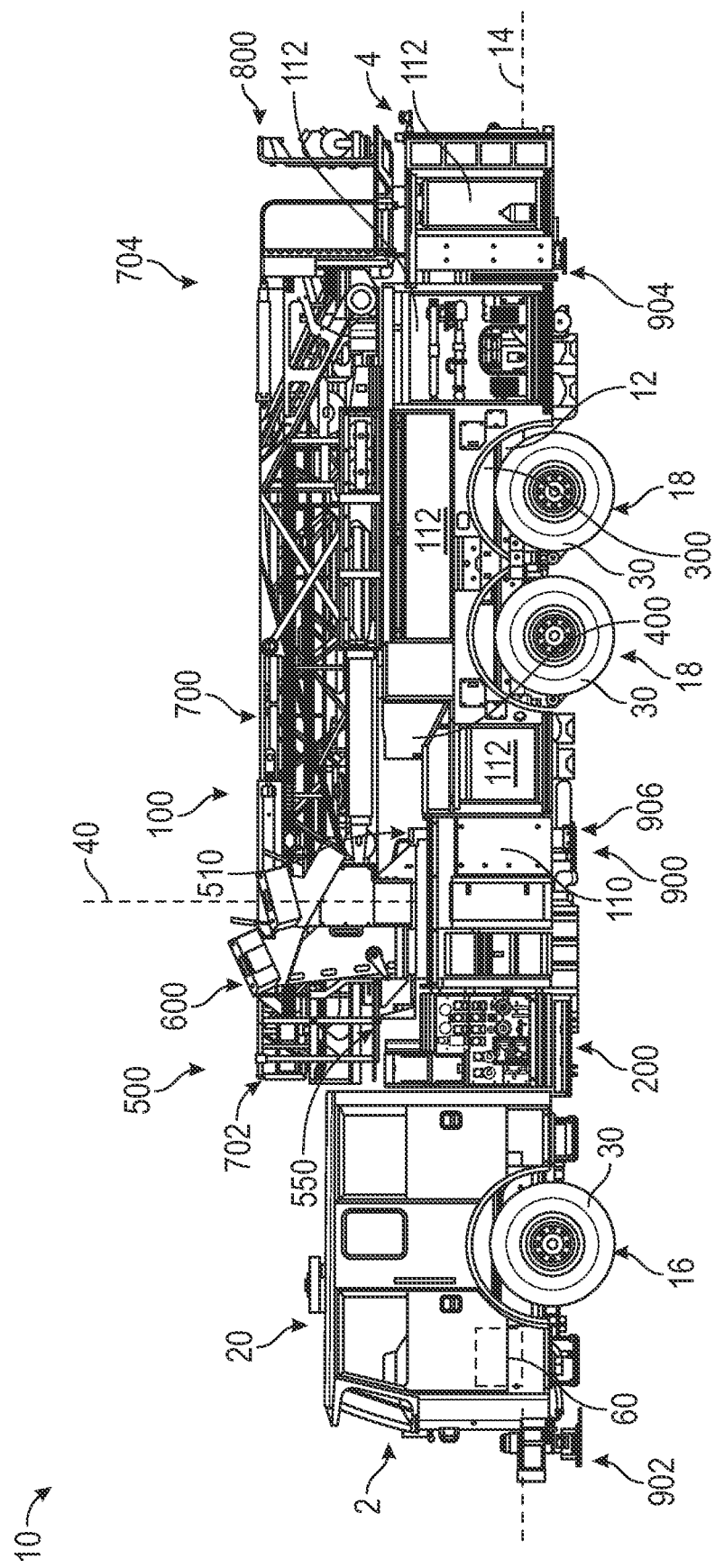
FIG. 1 is a side view of a vehicle, according to an exemplary embodiment.

According to the exemplary embodiment shown in FIG. 1, a vehicle, shown as fire apparatus 10, is configured as a mid-mount quint fire truck having a tandem rear axle. A "quint" fire truck as used herein may refer to a fire truck that includes a water tank, an aerial ladder, hose storage, ground ladder storage, and a water pump. In other embodiments, the fire apparatus 10 is configured as a mid-mount quint fire truck having a single rear axle. A tandem rear axle may include two solid axle configurations or may include two pairs of axles (e.g., two pairs of half shafts, etc.) each having a set of constant velocity joints and coupling two differentials to two pairs of hub assemblies. A single rear axle chassis may include one solid axle configuration or may include one pair of axles each having a set of constant velocity joints and coupling a differential to a pair of hub assemblies, according to various alternative embodiments. In still other embodiments, the fire apparatus 10 is configured as a non-quint mid-mount fire truck having a single rear axle or a tandem rear axle. In yet other embodiments, the fire apparatus 10 is configured as a rear-mount, quint or non-quint, single rear axle or tandem rear axle, fire truck. In still other embodiments, the vehicle is not a fire truck, but is any other type of vehicle that includes a pivoting cab similar to the fire apparatus 10 (e.g., a COE vehicle design, etc.), which is described in greater detail herein.

As shown in FIG. 1, the fire apparatus 10 includes a chassis, shown as frame 12, having longitudinal frame rails that define an axis, shown as longitudinal axis 14, that extends between a first end, shown as front end 2, and an opposing second end, shown as rear end 4, of the fire apparatus 10; a first axle, shown as front axle 16, coupled to the frame 12; one or more second axles, shown as rear axles 18, coupled to the frame 12; a first assembly, shown as front cabin 20, coupled to and supported by the frame 12; a prime mover, shown as engine 60, coupled to and supported by the frame 12; and a second assembly, shown as rear assembly 100, coupled to and supported by the frame 12. According to the exemplary embodiment shown in FIG. 1, the front cabin 20 and the engine 60 are arranged in a COE configuration where the engine 60 is positioned beneath the front cabin 20.

As shown in FIG. 1, the front axle 16 and the rear axles 18 include tractive assemblies, shown as wheel and tire assemblies 30. As shown in FIG. 1, the front cabin 20 is positioned forward of the rear assembly 100 (e.g., with respect to a forward direction of travel for the fire apparatus 10 along the longitudinal axis 14, etc.). According to an alternative embodiment, the cab assembly or a second cab assembly may be positioned behind the rear assembly 100 (e.g., with respect to a forward direction of travel for the fire apparatus 10 along the longitudinal axis 14, etc.). The cab assembly may be positioned behind the rear assembly 100 on, by way of example, a rear tiller fire apparatus. In some embodiments, the fire apparatus 10 is a ladder truck with a front portion that includes the front cabin 20 pivotably coupled to a rear portion that includes the rear assembly 100 (i.e., the rear portion is towed by the front portion).

According to an exemplary embodiment, the engine 60 receives fuel (e.g., gasoline, diesel, etc.) from a fuel tank and combusts the fuel to generate mechanical energy. A transmission receives the mechanical energy and provides an output to a drive shaft. The rotating drive shaft is received by a differential, which conveys the rotational energy of the drive shaft to a final drive (e.g., the front axle 16, the rear axles 18, the wheel and tire assemblies 30, etc.). The final drive then propels or moves the fire apparatus 10. According to an exemplary embodiment, the engine 60 is a compression-ignition internal combustion engine that utilizes diesel fuel. In alternative embodiments, the engine 60 is another type of prime mover (e.g., a spark-ignition engine, a fuel cell, an electric motor, etc.) that is otherwise powered (e.g., with gasoline, compressed natural gas, propane, hydrogen, electricity, etc.).

As shown in FIG. 1, the rear assembly 100 includes a body assembly, shown as body 110, coupled to and supported by the frame 12; a fluid driver, shown as pump system 200, coupled to and supported by the frame 12; a chassis support member, shown as torque box 300, coupled to and supported by the frame 12; a fluid reservoir, shown as water tank 400, coupled to the body 110 and supported by the torque box 300 and/or the frame 12; and an aerial assembly, shown as aerial assembly 500, pivotably coupled to the torque box 300 and supported by the torque box 300 and/or the frame 12. In some embodiments, the rear assembly 100 additionally or alternatively includes an agent or foam tank (e.g., that receives and stores a fire suppressing agent, foam, etc.). In some embodiments, the rear assembly 100 does not include the pump system 200, the torque box 300, the water tank 400, and/or the aerial assembly 500.

As shown in FIG. 1, the body 110 define a plurality of compartments, shown as storage compartments 112. The storage compartments 112 may receive and store miscellaneous items and gear used by emergency response personnel (e.g., helmets, axes, oxygen tanks, hoses, medical kits, ground ladders, hoses, etc.).

As shown in FIG. 1, the aerial assembly 500 includes a turntable assembly, shown as turntable 510, pivotably coupled to the torque box 300; a platform, shown work platform 550, coupled to the turntable 510; a console, shown as control console 600, coupled to the turntable 510; a ladder assembly, shown as aerial ladder assembly 700, having a first end (e.g., a base end, a proximal end, a pivot end, etc.), shown as proximal end 702, pivotably coupled to the turntable 510, and an opposing second end (e.g., a free end, a distal end, a platform end, an implement end, etc.), shown as distal end 704; and an implement, shown as work basket 800, coupled to the distal end 704. In other embodiments, the aerial assembly 500 does not include the work basket 800. In some embodiments, the work basket 800 is replaced with or additionally includes a nozzle (e.g., a deluge gun, a water cannon, a water turret, etc.) or other tool. By way of example, the nozzle may be connected to a water source (e.g., the water tank 400, an external source, etc.) with a conduit extending along the aerial ladder assembly 700 (e.g., along the side of the aerial ladder assembly 700, beneath the aerial ladder assembly 700, in a channel provided in the aerial ladder assembly 700, etc.). By pivoting the aerial ladder assembly 700 into a raised position, the nozzle may be elevated to expel water from a higher elevation to facilitate suppressing a fire.

As shown in FIG. 1, the torque box 300 is coupled to the frame 12. In one embodiment, the torque box 300 extends laterally the full width between the lateral outsides of the frame rails of the frame 12. According to an exemplary embodiment, the aerial assembly 500 (e.g., the turntable 510, the work platform 550, the control console 600, the aerial ladder assembly 700, the work basket 800, etc.) is rotatably coupled to the torque box 300 such that the aerial assembly 500 is selectively repositionable into a plurality of operating orientations about a vertical axis, shown as vertical pivot axis 40.

As shown in FIG. 1, the fire apparatus 10 includes a stability system, shown as stability assembly 900. The stability assembly 900 includes first stabilizers, shown as front downriggers 902, coupled to each lateral side of the front end 2 of the fire apparatus 10. According to an exemplary embodiment, the front downriggers 902 are selectively deployable (e.g., extendable, etc.) downward to engage a ground surface. As shown in FIG. 1, the stability assembly 900 includes second stabilizers, shown as rear downriggers 904, coupled to each lateral side of the rear end 4 of the fire apparatus 10. According to an exemplary embodiment, the rear downriggers 904 are selectively deployable (e.g., extendable, etc.) downward to engage a ground surface. As shown in FIG. 1, the stability assembly 900 includes third stabilizers, shown outriggers 906, coupled to the torque box 300 and/or the frame 12 between the front end 2 and the rear end 4 of the fire apparatus 10. According to an exemplary embodiment, the outriggers 906 are selectively deployable (e.g., extendable, etc.) outward from each of the lateral sides of the body 110 and/or downward to engage a ground surface.

Figure 2:
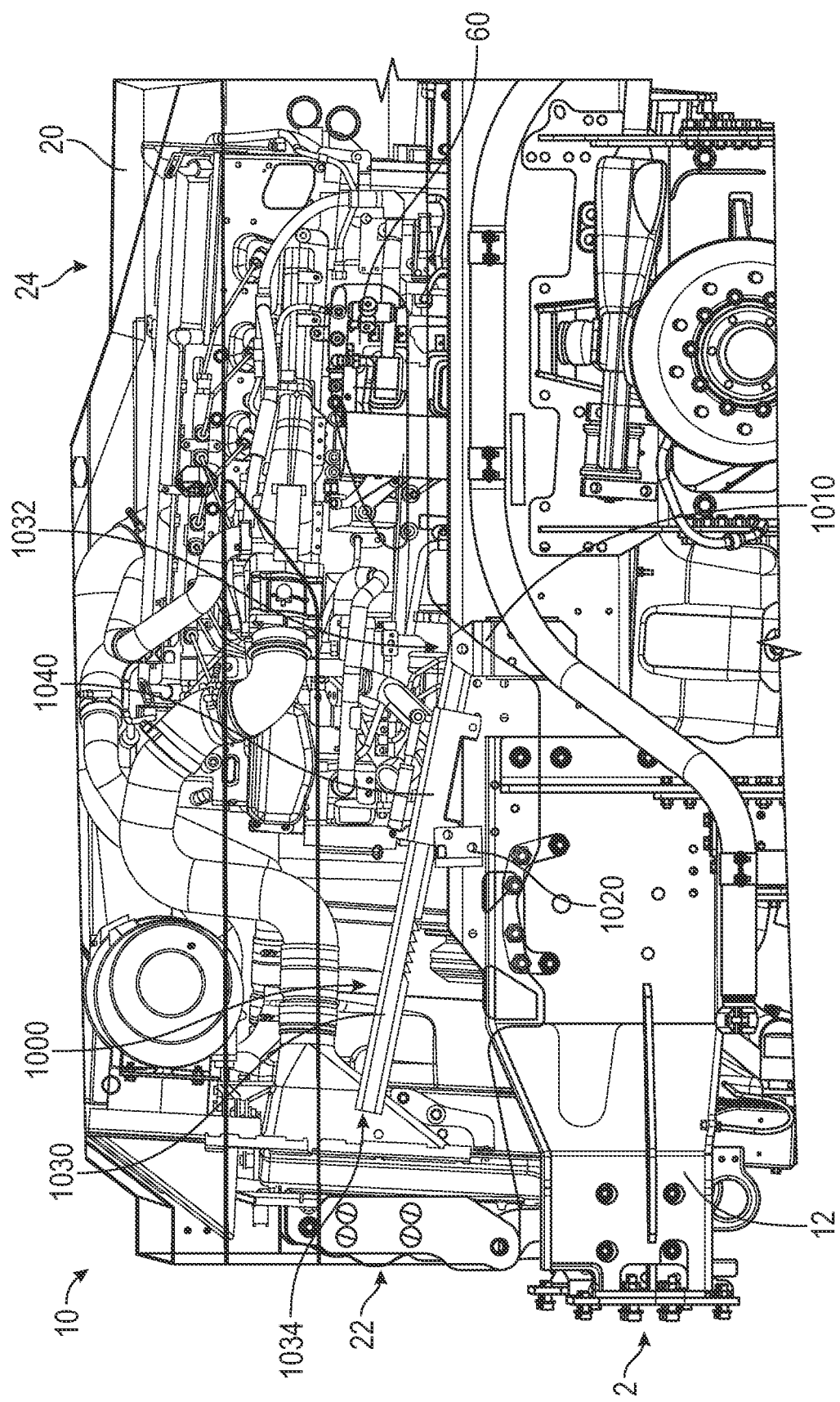
FIG. 2 is a detailed view of a cab of the vehicle of FIG. 1 with a stay arm and arranged in a first orientation, according to an exemplary embodiment.
Figure 3:
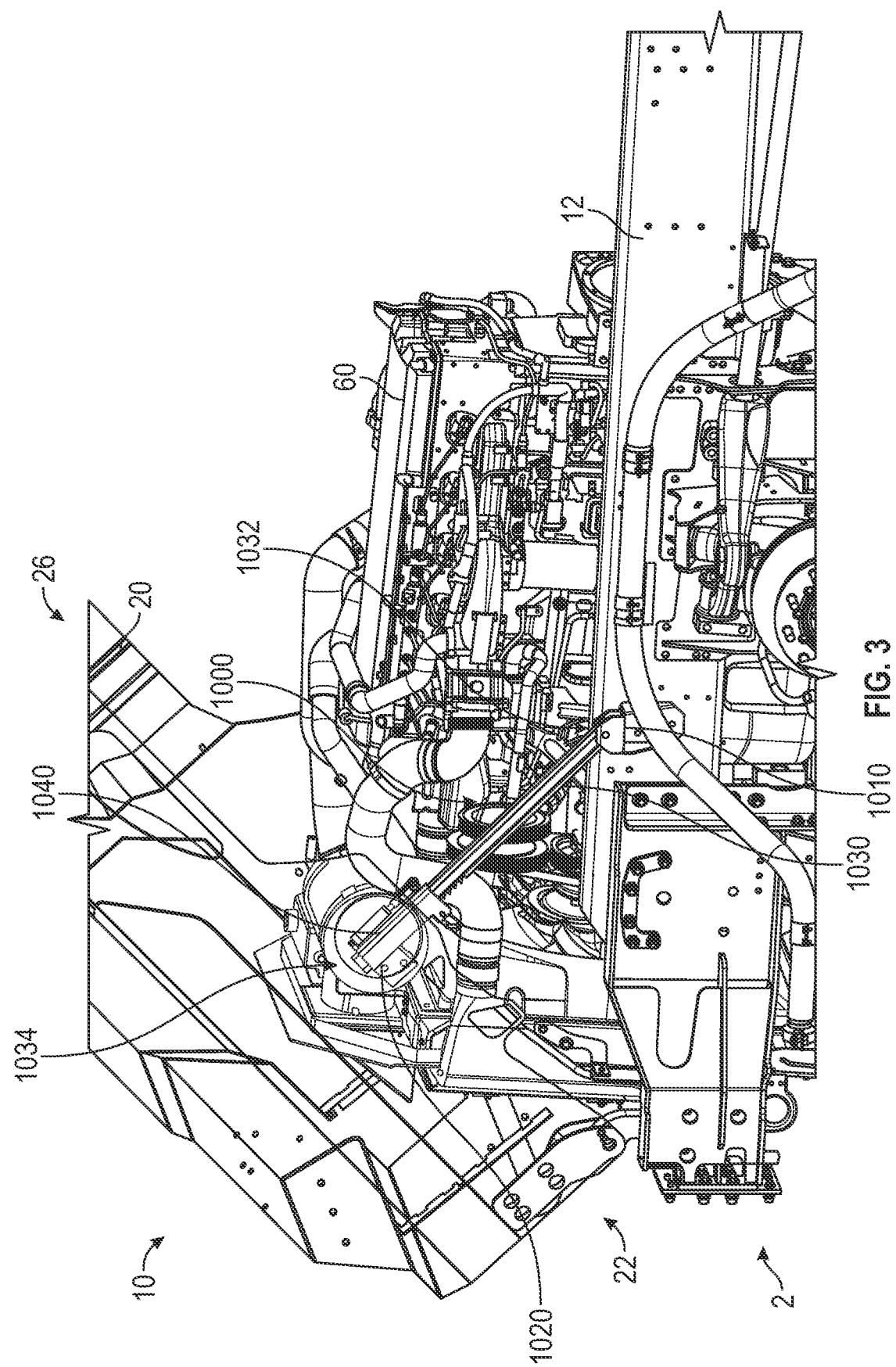
FIG. 3 is a detailed view of the cab of FIG. 2 with the stay arm holding the cab in a second orientation, according to an exemplary embodiment.

As shown in FIGS. 2 and 3, the fire apparatus 10 includes a bracket, shown as pivot bracket 22, coupled between the frame 12 and the front cabin 20 at the front end 2 of the fire apparatus 10. The pivot bracket 22 facilitates selectively pivoting the front cabin 20 between a first orientation, shown as lowered position 24, and a second orientation, shown as raised position 26. When in the lowered position 24, the front cabin 20 extends over and hides the engine 60. When in the raised position 26, the front cabin 20 is pivoted out of the way such that the engine 60 is exposed and accessible (e.g., to facilitate access, maintenance, inspection, repair, etc.).

According to the exemplary embodiment shown in FIGS. 2-6, the fire apparatus 10 includes a support assembly, shown as stay arm assembly 1000. According to an exemplary embodiment, the stay arm assembly 1000 is configured to automatically hold or lock the front cabin 20 (or another pivoting element or component) in the raised position 26 after being pivoted from the lowered position 24 to prevent the front cabin 20 (or another pivoting element or component) from inadvertently pivoting back to the lowered position 24 absent user interaction or absent a user command. As shown in FIGS. 2-6, the stay arm assembly 1000 includes a first bracket, shown as frame bracket 1010, a second bracket, shown as cab bracket 1020, a longitudinal member or bar, shown as stay arm 1030, and a locking mechanism, shown as locking assembly 1040.

Figure 4:
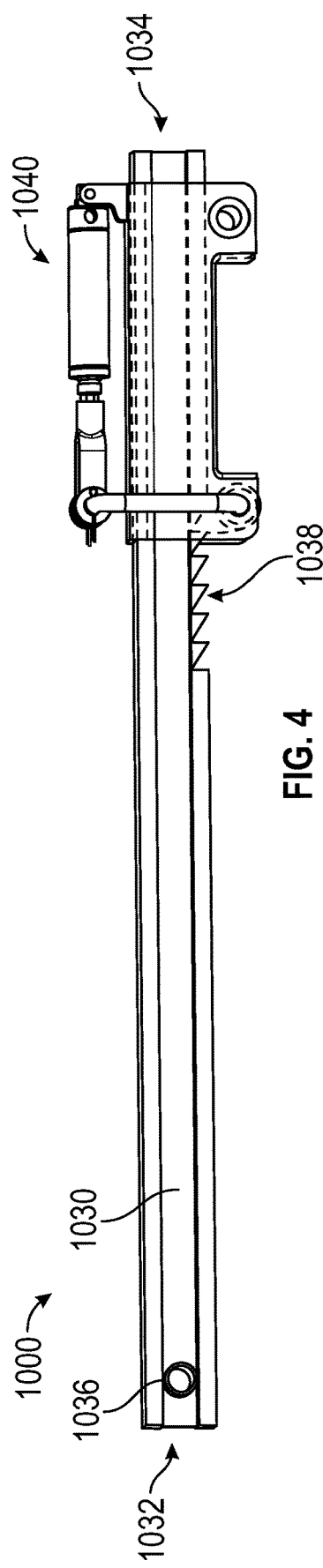
FIG. 4 is a detailed view of the stay arm of FIG. 2, according to an exemplary embodiment.
Figure 5:
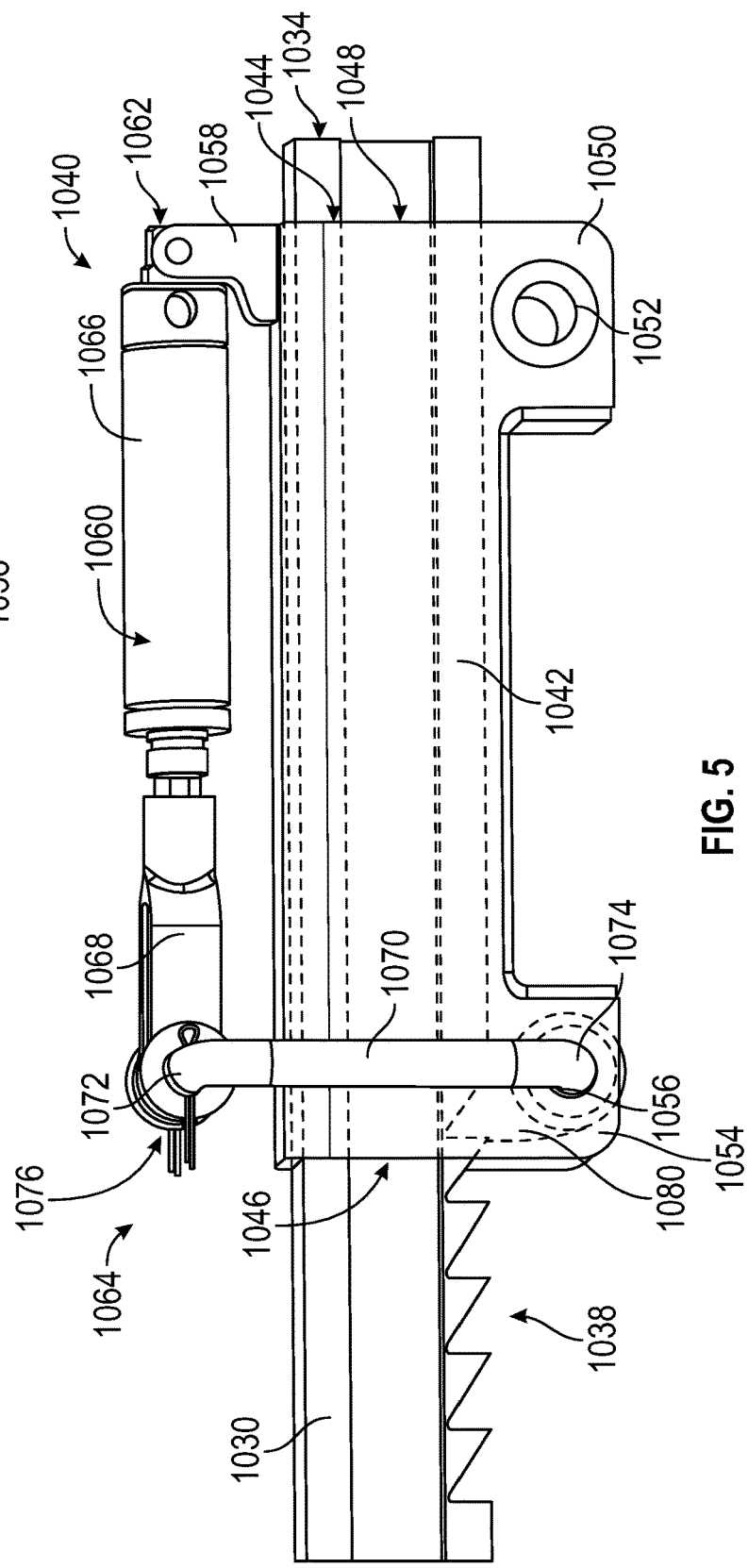
FIG. 5 is a detailed view of a locking mechanism of the stay arm of FIG. 4 in a first configuration, according to an exemplary embodiment.
Figure 6:
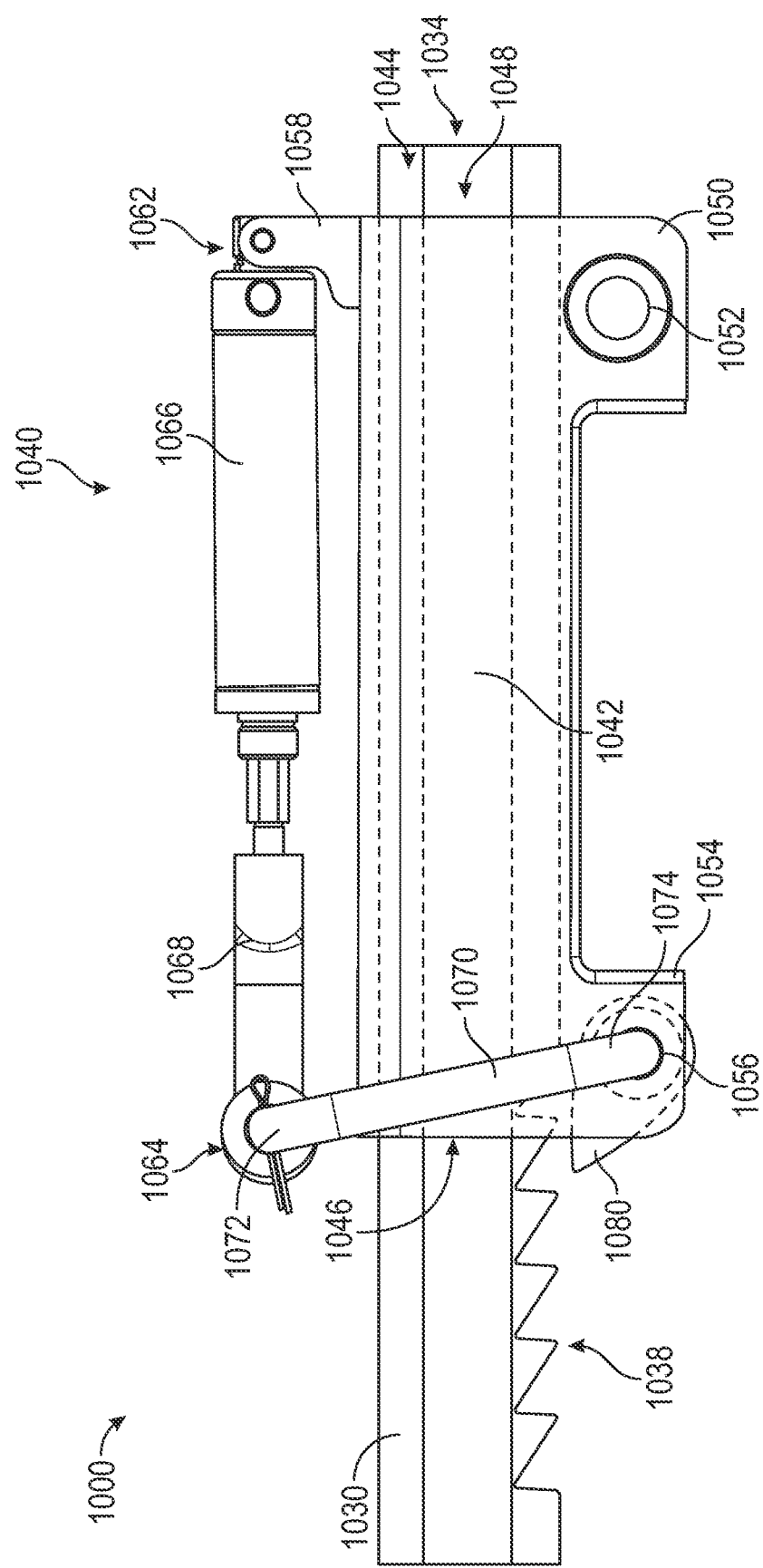
FIG. 6 is a detailed view of the locking mechanism FIG. 5 in a second configuration, according to an exemplary embodiment.

As shown in FIGS. 2 and 3, the frame bracket 1010 is coupled to the frame 12 and the cab bracket 1020 is coupled to a portion of the front cabin 20 (e.g., an interior wall along an underside thereof, etc.) (or a portion of another pivoting element or component). As shown in FIGS. 2-6, the stay arm 1030 has a first end, shown as end 1032, and an opposing second end, shown as end 1034. As shown in FIG. 4, the end 1032 of the stay arm 1030 defines an interface, shown as coupling aperture 1036. As shown in FIGS. 2 and 3, the end 1032 of the stay arm 1030 interfaces with the frame bracket 1010 such that the coupling aperture 1036 facilitates pivotably coupling the stay arm 1030 thereto. As shown in FIGS. 4-6, the stay arm 1030 defines an indexing interface, shown as locking interface 1038, having a plurality of notches or detents positioned between the end 1032 and the end 1034 thereof. The locking interface 1038 may be offset toward the end 1034. In other embodiments, the locking interface 1038 has a single notch or detent.

As shown in FIGS. 5 and 6, the locking assembly 1040 includes a translatable or slidable bracket, shown as slide 1042, slidably coupled to and translatable along the stay arm 1030 between the end 1032 and the end 1034 thereof. The slide 1042 has a first end, shown as coupling end 1044, and an opposing second end, shown as locking end 1046. The slide 1042 defines an internal slot, shown as channel 1048, that receives the stay arm 1030. The slide 1042 has a first flange, shown as coupling flange 1050, positioned at the coupling end 1044 of the slide 1042 and that extends downward therefrom and beneath the stay arm 1030. The coupling flange 1050 defines a first interface, shown as coupling aperture 1052. As shown in FIGS. 2 and 3, the coupling flange 1050 of the slide 1042 of the locking assembly 1040 interfaces with the cab bracket 1020 such that the coupling aperture 1052 facilitates pivotably coupling the slide 1042 thereto.

As shown in FIGS. 5 and 6, the slide 1042 has a second flange, shown as locking flange 1054, positioned at the locking end 1046 of the slide 1042 and that extends downward therefrom and beneath the stay arm 1030. The locking flange 1054 defines a second interface, shown as coupling aperture 1056. The slide 1042 includes a third interface or bracket, shown as actuator mount 1058, positioned at the coupling end 1044 of the slide 1042 and that extends upward therefrom and above the stay arm 1030.

As shown in FIGS. 5 and 6, the locking assembly 1040 includes an actuator, shown as release actuator 1060. The release actuator 1060 has a first actuator end, shown as end 1062, pivotably coupled to the actuator mount 1058 of the slide 1042 and a second actuator end, shown as end 1064. The release actuator 1060 includes a first component, shown as cylinder 1066, and a second component, shown as rod 1068. According to an exemplary embodiment, the rod 1068 is configured to selectively retract into and extend out of the cylinder 1066. In some embodiments, the release actuator 1060 is a hydraulically-operated actuator (e.g., a hydraulic cylinder, etc.). In some embodiments, the release actuator 1060 is a pneumatically-operated actuator (e.g., a pneumatic cylinder, etc.). In some embodiments, the release actuator 1060 is an electrically-operated actuator (e.g., a linear electric actuator, etc.).

As shown in FIGS. 5 and 6, the locking assembly 1040 includes an arm, shown as release arm 1070, and an engagement tooth or cam, shown as pawl 1080. The release arm 1070 has a first end, shown as end 1072, pivotably coupled to the end 1064 of the release actuator 1060 and an opposing second end, shown as end 1074, engaged with and extending into the coupling aperture 1056 of the locking flange 1054 of the slide 1042. The release arm 1070, therefore, extends from the release actuator 1060, across the stay arm 1030, and to the locking flange 1054 of the slide 1042. The pawl 1080 is positioned within the locking flange 1054 of the slide 1042 and engages with the end 1074 of the release arm 1070. In some embodiments, the orientation of the pawl 1080 is fixed relative to the release arm 1070 (e.g., the pawl 1080 rotates with the release arm 1070 and does not move relative to the release arm 1070, etc.). As shown in FIG. 5, the pawl 1080 has a shape (e.g., a cam shape, etc.) that corresponds with the notches of the locking interface 1038.

According to the exemplary embodiment shown in FIG. 5, the pawl 1080 is at least partially positioned within the channel 1048 of the slide 1042 and selectively engages with the notches of the locking interface 1038 to lock or hold the slide 1042 in position and, thereby, prevent the front cabin 20 from pivoting from the raised position 26 to the lowered position 24 while the release actuator 1060 is in a first or locked configuration (e.g., the rod 1068 is retracted, etc.). In some embodiments, the release arm 1070 is biased or spring loaded (e.g., via a torsional spring 1076 at the connection between the release arm 1070 and the release actuator 1060, etc.) such that the pawl 1080 ratchets as the slide 1042 translates toward the end 1034 of the stay arm 1030 and across the locking interface 1038. According to the exemplary embodiment shown in FIG. 6, the pawl 1080 disengages from the notches of the locking interface 1038 to release the slide 1042 and, thereby, allow the front cabin 20 to pivot from the raised position 26 to the lowered position 24 while the release actuator 1060 is in a second or release configuration (e.g., the rod 1068 is extended, etc.).

By way of example, an operator may lift the front cabin 20 from the lowered position 24 to the raised position 26. As the slide 1042 translates along the stay arm 1030, the pawl 1080 may engage, index, or ratchet with the notches of the locking interface 1038, which thereby prevents the front cabin 20 from pivoting back to the lowered position 24. The locking assembly 1040 may then hold the front cabin 20 in the raised position 26 until further operator interaction with the stay arm assembly 1000. By way of example, the operator may provide a release command to the stay arm assembly 1000 (e.g., through an operator interface of the fire apparatus 10, through a button associated with the stay arm assembly 1000, etc.). The release command may then cause the release actuator 1060 to extend, which causes the release arm 1070 and, thereby, the pawl 1080 to pivot and disengage from the notches of the locking interface 1038. The operator may then lower the front cabin 20 from the raised position 26 to the lowered position 24. In some embodiments, one or more dampers (e.g., pneumatic dampers, etc.) extend between the frame 12 and the front cabin 20 to provide controlled or assisted lowering and/or raising of the front cabin 20 by the operator.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the fire apparatus 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:
1. A vehicle comprising:
a chassis;

a cab pivotably coupled to the chassis, the cab repositionable between a lowered position and a raised position; and
a support assembly extending between the chassis and the cab, the support assembly including:
  a first bracket coupled to the chassis;
  a second bracket coupled to the cab;
  a stay arm having a first stay arm end and an opposing second stay arm end, the first stay arm end coupled to the first bracket, the stay arm defining a locking interface between the first stay arm end and the opposing second stay arm end, the locking interface including one or more notches; and
  a locking assembly coupled to the stay arm, the locking assembly including:
    a slide translatable along the stay arm between the first stay arm end and the opposing second stay arm end, the slide defining a first interface, a second interface, and a third interface, the first interface coupled to the second bracket;
    an actuator having a first actuator end and a second actuator end, the first actuator end coupled to the third interface of the slide;
    a release arm having a first release arm end and a second release arm end, the first release arm end coupled to the second actuator end, the second release arm end coupled to the second interface of the slide; and
    a pawl coupled to the second release arm end, the pawl positioned to engage with the locking interface when the actuator is in a first configuration and disengage from the locking interface when the actuator is in a second configuration.

2. The vehicle of claim 1, wherein the slide defines a channel that receives the stay arm.

3. The vehicle of claim 2, wherein the first interface is a first flange that extends downward from a first slide end of the slide and beneath the stay arm, and wherein the first flange defines a first aperture that pivotably couples the slide to the second bracket.

4. The vehicle of claim 3, wherein the second interface is a second flange that extends downward from an opposing second slide end of the slide and beneath the stay arm, and wherein the second flange defines a second aperture that receives the second release arm end of the release arm such that the pawl is at least partially positioned within the channel.

5. The vehicle of claim 4, wherein an orientation of the pawl is fixed relative to the release arm.

6. The vehicle of claim 5, wherein the one or more notches include a plurality of notches.

7. The vehicle of claim 6, wherein an interface between the first release arm end of the release arm and the second actuator end is spring biased such that the pawl ratchets as the slide translates toward the opposing second stay arm end and across the plurality of notches.

8. The vehicle of claim 4, wherein the third interface is a mount that extends upward from the first slide end of the slide and above the stay arm, and wherein the first actuator end is pivotably coupled to the mount.

9. The vehicle of claim 1, wherein the actuator is a linear actuator, the first configuration is a retracted configuration, and the second configuration is an extended configuration.

10. The vehicle of claim 1, wherein the pawl has a tooth shape or a cam shape.

11. The vehicle of claim 1, wherein the release arm extends from the actuator, across the stay arm, and to the second interface of the slide.

12. A support assembly for a vehicle, the support assembly comprising:
  a first bracket configured to couple to a first portion of the vehicle;
  a second bracket configured to couple to a second portion of the vehicle;
  a stay arm having a first stay arm end and an opposing second stay arm end, the first stay arm end coupled to the first bracket, the stay arm defining a locking interface between the first stay arm end and the opposing second stay arm end, the locking interface including one or more notches; and
  a locking assembly coupled to the stay arm, the locking assembly including:
    a slide translatable along the stay arm between the first stay arm end and the opposing second stay arm end, the slide defining a first interface, a second interface, and a third interface, the first interface coupled to the second bracket;
    an actuator having a first actuator end and a second actuator end, the first actuator end coupled to the third interface of the slide;
    a release arm having a first release arm end and a second release arm end, the first release arm end coupled to the second actuator end, the second release arm end coupled to the second interface of the slide; and
    a pawl coupled to the second release arm end, the pawl positioned to engage with the locking interface when the actuator is in a first configuration and disengage from the locking interface when the actuator is in a second configuration.

13. The support assembly of claim 12, wherein the first portion is a chassis of the vehicle, and wherein the second portion is a cab of the vehicle.

14. The support assembly of claim 12, wherein the first portion is a chassis of the vehicle, and wherein the second portion is an engine enclosure of the vehicle.

15. The support assembly of claim 12, wherein the second portion is pivotable relative to the first portion.

16. The support assembly of claim 12, wherein an orientation of the pawl is fixed relative to the release arm.

17. The support assembly of claim 12, wherein the one or more notches include a plurality of notches.

18. The support assembly of claim 12, wherein an interface between the first release arm end of the release arm and the second actuator end is spring biased.

19. A support assembly comprising:
  a first bracket configured to couple to a first component;
  a second bracket configured to couple to a second component;
  a stay arm having a first stay arm end and an opposing second stay arm end, the first stay arm end pivotably coupled to the first bracket, the stay arm defining a locking interface between the first stay arm end and the opposing second stay arm end, the locking interface including a plurality of notches;
  a slide translatable along the stay arm between the first stay arm end and the opposing second stay arm end, the slide defining a channel that receives the stay arm, the slide including:
    a first flange extending downward from a first slide end of the slide and beneath the stay arm, the first flange defining a first aperture that pivotably couples the slide to the second bracket;

a second flange extending downward from an opposing second slide end of the slide and beneath the stay arm, the second flange defining a second aperture; and a mount extending upward from the first slide end of the slide and above the stay arm;

an actuator having a first actuator end and a second actuator end, the first actuator end pivotably coupled to the mount;

an arm having a first arm end and a second arm end, the first arm end coupled to the second actuator end at an interface and the second arm end engaging with the second aperture of the second flange of the slide such that the arm extends from the actuator, across the stay arm, and to the second flange of the slide; and a pawl coupled to the second arm end of the arm and at least partially positioned within the channel of the slide, wherein the pawl is positioned to engage with the locking interface when the actuator is in a first configuration and disengage from the locking interface when the actuator is in a second configuration.

\* \* \* \* \*